April 6, 1965 H. N. STAATS 3,176,841

DOCUMENTARY STORAGE AND RETRIEVAL SYSTEMS

Filed Sept. 29, 1960 8 Sheets-Sheet 1

INVENTOR.
Henry N. Staats
By: Olson & Trexler
Attys.

April 6, 1965 H. N. STAATS 3,176,841

DOCUMENTARY STORAGE AND RETRIEVAL SYSTEMS

Filed Sept. 29, 1960 8 Sheets-Sheet 2

INVENTOR.
Henry N. Staats
BY Olson & Trexler
attys.

DOCUMENTARY STORAGE AND RETRIEVAL SYSTEMS

Filed Sept. 29, 1960

INVENTOR.
Henry N. Staats
BY
Olson & Trexler
Attys.

INVENTOR.
Henry N. Staats
BY
Olson & Trexler
Attys.

DOCUMENTARY STORAGE AND RETRIEVAL SYSTEMS

Filed Sept. 29, 1960

INVENTOR.
Henry N. Staats
BY: Olson & Trexler
Att'ys.

DOCUMENTARY STORAGE AND RETRIEVAL SYSTEMS

Filed Sept. 29, 1960

INVENTOR.
Henry N. Staats
By: Olson & Trexler
Attys.

DOCUMENTARY STORAGE AND RETRIEVAL SYSTEMS

Filed Sept. 29, 1960 8 Sheets-Sheet 7

INVENTOR.
Henry N. Staats
BY
Olson & Trexler
Attys.

April 6, 1965 H. N. STAATS 3,176,841

DOCUMENTARY STORAGE AND RETRIEVAL SYSTEMS

Filed Sept. 29, 1960 8 Sheets-Sheet 8

INVENTOR.
Henry N. Staats
BY: Olson & Trexler
attys.

3,176,841

DOCUMENTARY STORAGE AND RETRIEVAL SYSTEMS

Henry N. Staats, 1344 Linden Ave., Deerfield, Ill.
Filed Sept. 29, 1960, Ser. No. 59,207
16 Claims. (Cl. 209—81)

This invention relates generally to the art of information storage and retrieval, and more particularly to documentary storage and retrieval.

In this application, the term "documentary" is used to differentiate between a system wherein micro-images of actual documents are stored, and a system in which information is stored in symbol form only. Obviously, fairly sophisticated apparatus is needed for reading out the information stored with the well-known punched cards and magnetic memory tapes. Micro-images of actual documents are readily read by fairly simple optical enlarging devices which are now widely available in the market.

Most businesses, libraries, and many other organizations today have accumulated vast quantities of files which consume an extremely great amount of storage space. It is desirable to condense this storage space to a minimum, and simultaneously to reduce the time necessary for locating stored information to a minimum. Systems are known in which information is placed directly or in coded form on punched cards. The cards are punched in accordance with a predetermined code to indicate the information on each card. Such punch cards must be searched manually or mechanically. Obviously, manual searching is prohibitively slow and expensive. Mechanical searching is also quite limited as to speed. Furthermore, the code punching takes up a large part of the area of the card, and the area of the card which can be provided with microfilmed information is limited to one-fifth of the card.

Schemes have also been involved wherein microfilm images are placed on reels. Any such system is basically limited since each reel must be indexed, located and installed for search manually. There is no flexibility for individual removal of storage units. That is to say, an area having information on it which has become obsolete cannot be removed.

Many previous systems of information storage and retrieval require scanning of the surface of a card or the like by a search mechanism. Obviously, this requires individual card handling, and traversing of a rather large area.

Optical, mechanical and magnetic coding and search devices have been used heretofore. All of these require a rather large area on a card or the like, thus minimizing the area available for information storage. Complementary thereto, the coding and reading systems require a rather considerable space. Magnetic systems at first blush appear to possess space saving advantages, but it must be borne in mind that magnetic code indicia on a card or the like and the pickups therefore must be spaced to prevent inter-action. Furthermore, each magnetic pickup generally requires a preamplifier, thus greatly enlarging the size of the read-out equipment necessary.

Accordingly, it is an object of this invention to provide a documentary storage system overcoming the difficulties and drawbacks of the prior art.

It is an object of this invention to provide a documentary storage and retrieval system having an unusually high circuit rate for retrieval.

It is a further object of this invention to provide a documentary storage and retrieval system wherein a maximum area of a documentary storage card is available for the storage of information, and wherein substantially no surface area of the card or the like is required for coding search information.

It is a further object of this invention to provide a documentary storage and retrieval system wherein cards having information thereon are searched perpendicular to the faces of the cards.

It is yet another object of this invention to provide a documentary storage and retrieval system in which documentary cards are searched electrically and actually become a part of the electrical circuit.

It is another object of this invention to provide a documentary storage and retrieval system in which data storage cards are searched electrically along the edges of the cards transverse of the face of the cards.

Still another object of this invention is to provide a documentary storage and retrieval system wherein desired information bearing cards are automatically extracted from a file for consideration thereof without interruption of the searching.

Yet another object of this invention is to provide a documentary storage and retrieval system wherein further information can be added to storage cards at any time.

Stated rather briefly, information is stored on coded cards in accordance with the present invention. The cards may be metallic, and micro-images can be placed directly thereon by a known electro-static duplication process wherein the card is initially covered with zinc oxide. Up to 180 positive micro-images can be deposited on a five by eight card. When a metal card is used, the top edge is coated or covered with a non-conductive plastic film. In order to code or index the card for automatic retrieval, a coding device removes small sections of the plastic film exposing the metal edge of the card. Obviously, such coating can be effected manually, if desired. Units of metal can be exposed on one-sixteenth inch centers, or sixteen to the inch. This totals 128 across a five by eight inch card. A number of different code combinations in 128 digits is more than enough for even the most complex system.

Alternative to the use of a metal card, a non-conductive card of plastic or paper product can be used. In this instance, a metal wire or plate insert is provided along the top edge of the card, coding being effected as heretofore outlined. The cards are stored in racks, and are retrieved by a scanning device which travels on wheels along the racks. The travelling mechanism has a wedge shaped ramp which momentarily raises the metal cards in a wave form, so that a single card at the top of the wave has its edge protruding above all other cards in the rack. At this point the card is engaged by search fingers or contact wires. In accordance with the foregoing, there may be as many as 128 such wires on one-sixteenth inch centers. When a given combination of these wires is energized in code form, and this combination contacts a card in which corresponding metal areas are exposed, the card itself acts as a switching element to close the energized circuits and to effect ejectment of the card.

The cards preferably are ejected by a small electromechanical ram which pushes them sideways into a pair of high speed, counter rotating rubber wheels which practically instantaneously transfer them from the racks into a basket attached to the scanner and forming a part of the traversing mechanism.

Figured on a basis of sixteen cards stored per inch and a two inch traverse rate per second, 1,152,000 cards per hour can be searched. The traverse rate can be increased if desired. Obviously, the number of cards stored per inch, and the traverse rate will vary over rather large areas in accordance with the complexity of any particular installation.

Other and further objects and advantages of the present invention will be apparent from the following description when taken in connection with the accompanying drawings wherein.

Figures 7, 7A:
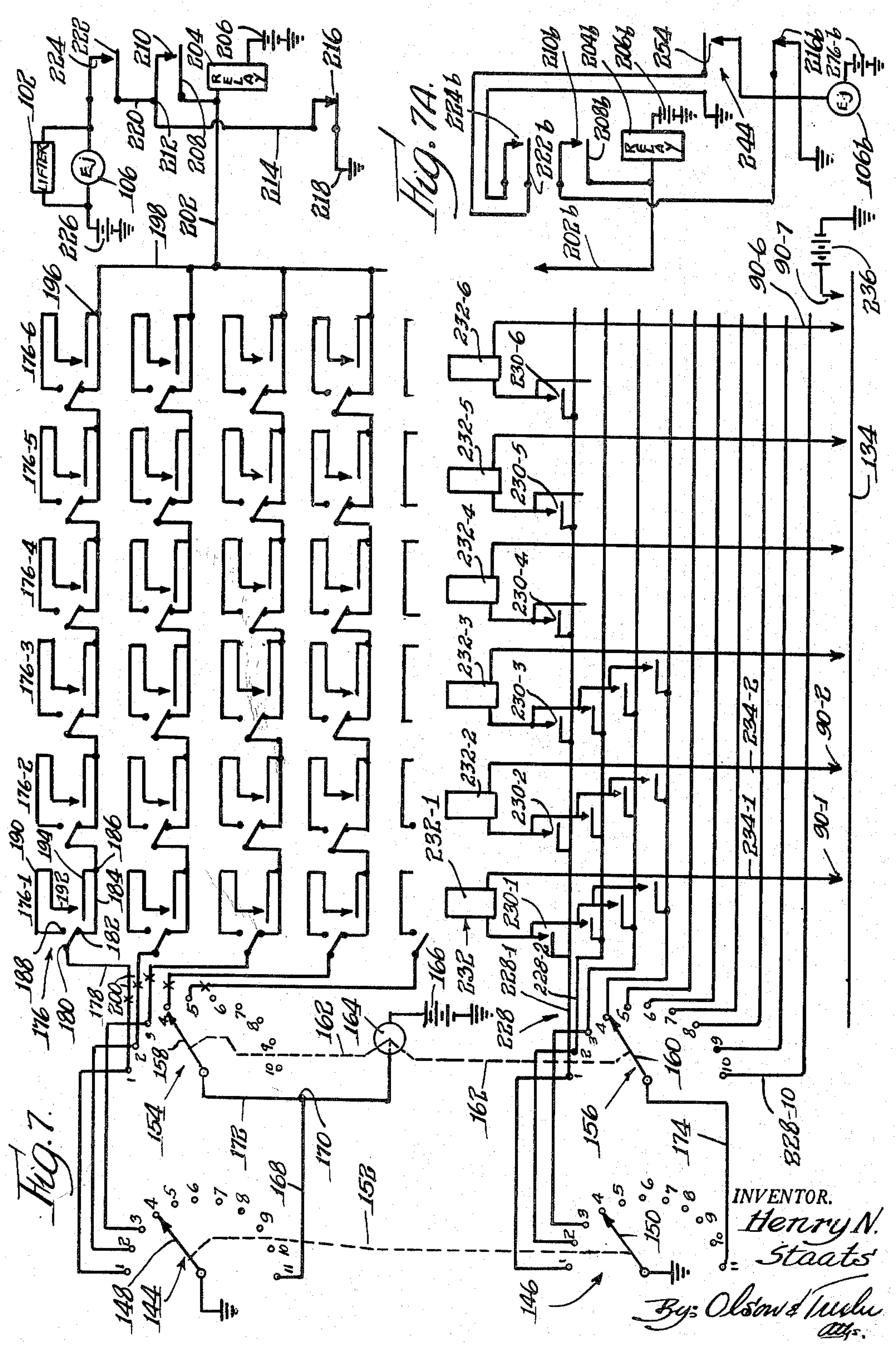
FIG. 7 is a wiring diagram of the electrical aspects of the invention.
Figures 8, 9, 10, 11, 12:
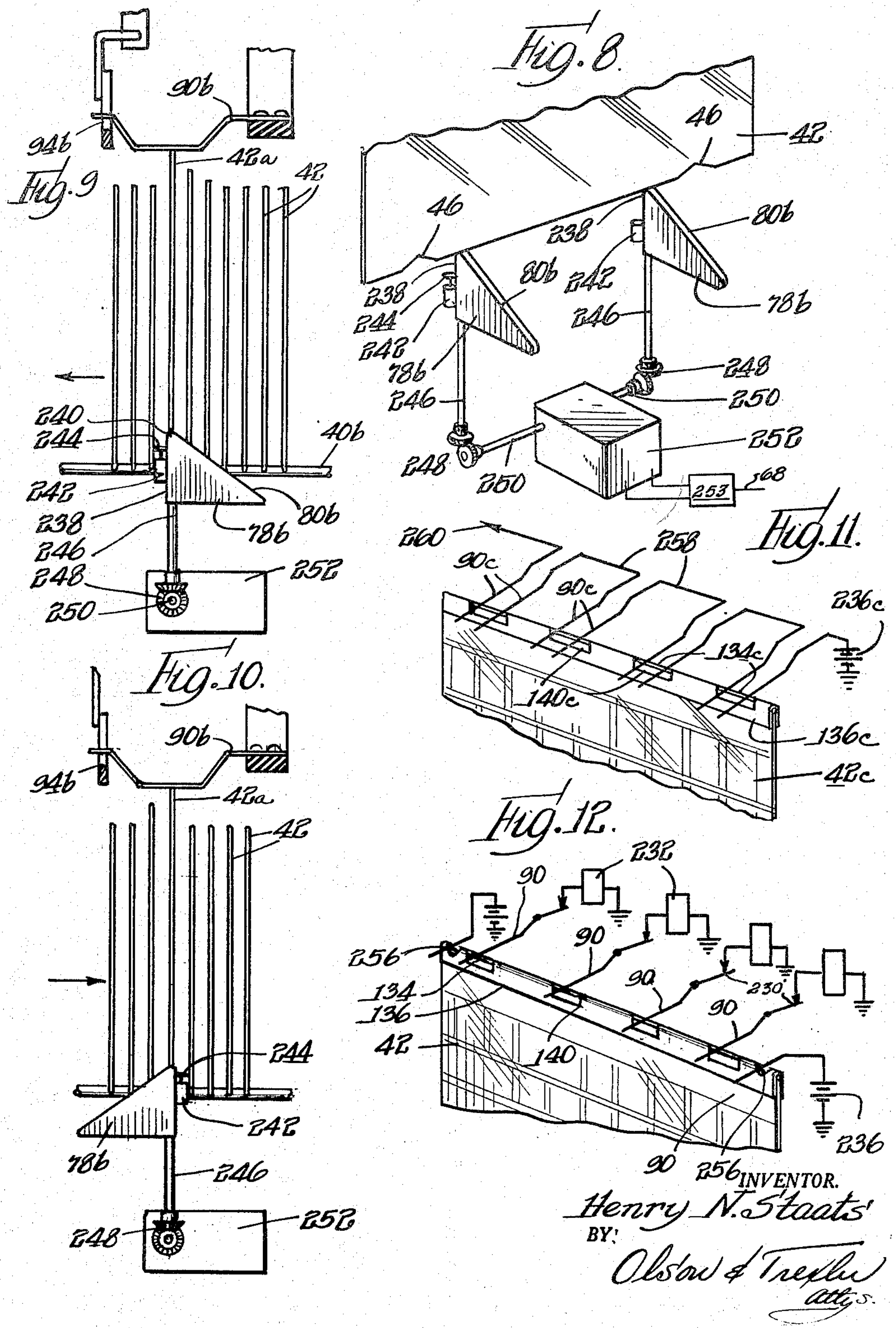
Figures 13, 14, 14A, 15, 16, 17, 18, 19, 20:
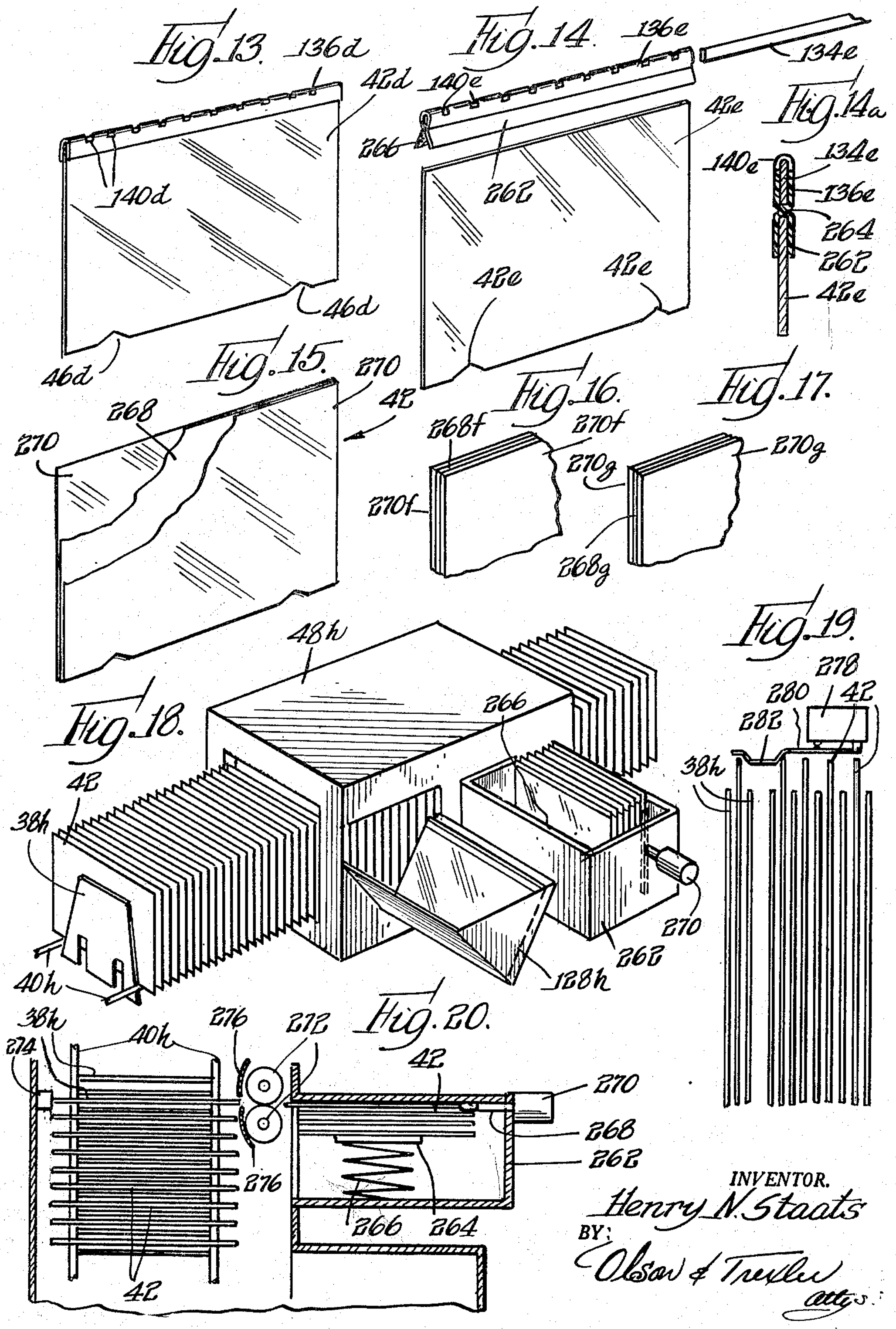

FIG. 7*a* is a fragmentary wiring diagram of a modification;

FIG. 8 is a perspective view showing a modified form of the invention relative to the ramp for lifting the cards;

FIG. 9 is a fragmentary side view of the modification of FIG. 8;

FIG. 10 is a view similar to FIG. 9 with the traversing mechanism moving in the opposite direction;

FIG. 11 is a perspective, somewhat schematic view showing one electrical arrangement of contacts;

FIG. 12 is a view similar to FIG. 11 showing another arrangement of contacts;

FIG. 13 is a perspective view of a modified form of card;

FIG. 14 is another perspective view of another modified card;

FIG. 14*a* is a cross-sectional view of the card of FIG. 14;

FIG. 15 is a perspective view of a modified card;

FIG. 16 is a fragmentary perspective view of a portion of one card;

FIG. 17 is a fragmentary perspective view of a portion of another card;

FIG. 18 is a perspective view of a modification of the machine showing automatic return of cards to the storage rack;

FIG. 19 is a detail vertical sectional view accompanying FIG. 18; and

FIG. 20 is a top view of the machine of FIG. 18.

Figure 1:
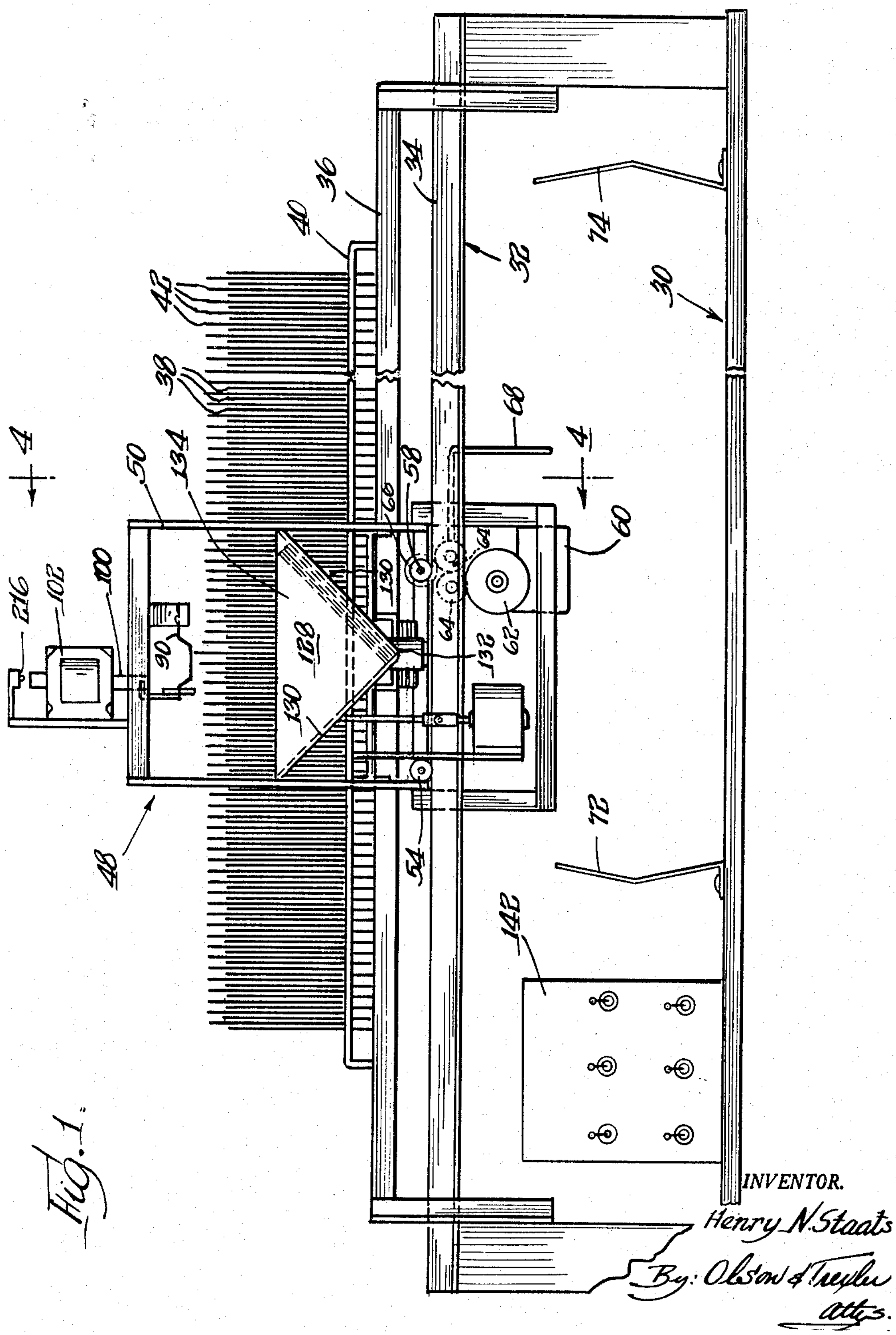
FIG. 1 is a side elevational view of a documentary storage and retrieval system constructed in accordance with the principles of the invention.
Figure 2:
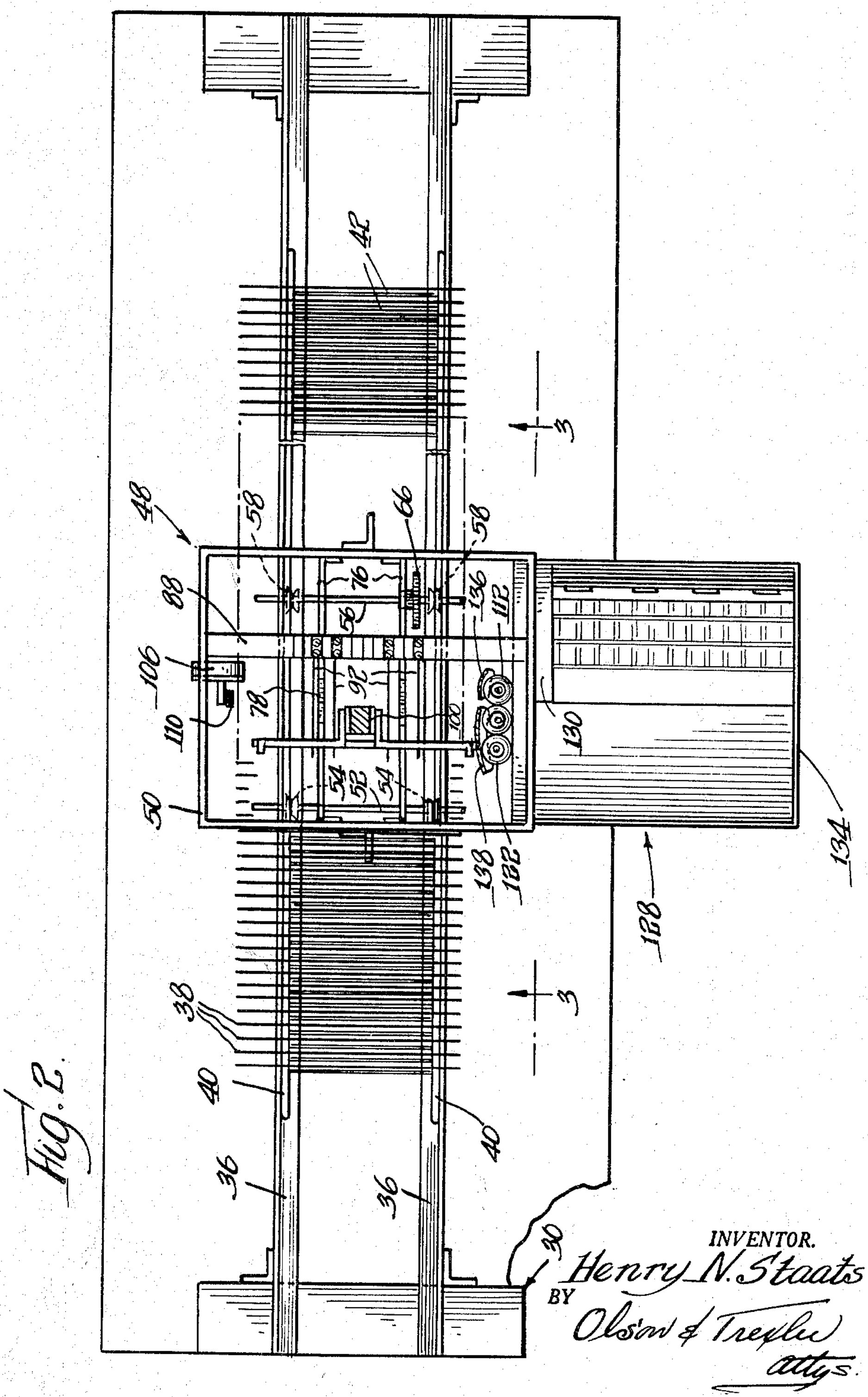
FIG. 2 is a top view thereof.

Referring now in greater particularity to the drawings, and first to FIGS. 1 and 2, there will be seen a frame 30 suitable for resting on any supporting surface, and including a pair of horizontally extending longitudinal members 32, shown as inverted T-shaped members (see FIG. 4), and having upstanding flanges 34 for rollingly supporting a carriage shortly to be described.

Spaced above the longitudinal rails or tracks 32 are further horizontal frame members 36 in spaced apart, parallel relation. These horizontal members support a plurality of spacer members 38 in closely spaced, parallel, transverse relation. The spacer members conveniently comprise steel plates, but are not limited thereto. In addition, the horizontal longitudinal members 36 support a pair of longitudinal rods 40 secured to the longitudinal members 36 and to the spacer plates 38. The rods 40 are positioned above the longitudinal members 36 and serve as supports for the cards 42. The cards are shown somewhat generally in FIG. 4, and will be discussed hereinafter in greater particularity. Each card conveniently is of the standard five by eight inch size, and is disposed substantially vertically between adjacent plates 38, resting on the supports 40. Preferably, the cards are notched along the bottom edge as indicated at 44 for cooperation with the supports 40 in order properly to position the cards from side to side. The notches have cam edges 46 along the opposite extremities thereof to facilitate movement of the cards over the supports 40.

The machine further includes a carriage 48. The carriage includes a frame 50 which is provided at one end thereof with a transverse axle 52 having idler wheels 54 riding on top of the flanges 34 of the horizontal tracks or rails 32. The peripheries of the wheels are circumferentially grooved or notched so as to ride properly on top of the flanges 34. At the opposite end the frame 50 of the carriage 48 carries a driven axle 56 having drive wheels 58 thereon. The driven wheels 58 are selectively driven in either direction of rotation to produce traverse of the carriage 48 in either direction, i.e. from left to right, or from right to left in FIGS. 1 and 2. The specific mechanism shown for driving the wheels 58 comprises a motor 60 suitably supported from the carriage frame, and preferably below the horizontal members 32. The motor acts through suitable speed reduction gearing to drive a large gear 62 which alternately drives either of a pair of gears 64. The two gears 64 alternately mesh with a driven gear 66 on the driven axle 56 to drive the drive wheels 58. To this end, the two gears 64 are mounted on a rocker mechanism controlled by a lever having a depending arm 68. The lever is engageable with upper and lower bumpers 70 to limit the upper and lower positions. The left gear 64 as viewed in FIG. 3 at all times meshes with the gear 62, and the two gears 64 mesh with one another. With the lever 68 in the raised, solid line position, the right gear meshes with the driven gear 66, while the left gear 64 does not. Alternatively, when the lever is down in the broken line position, the left gear 64 meshes with the driven gear 66, while the right gear 64 does not. Accordingly, the gear 66 is driven in either direction. Hence, the driving wheels 58 and the carriage 48 are driven in either direction.

A stop 72 (FIG. 1) is mounted near the left end of the machine for raising the lever 68 to cause the carriage 48 to progress to the right. Similarly, a stop 74 near the right end of the machine is engageable with the lever 68 to lower the lever, whereby to cause the carriage 48 to traverse to the left. Obviously, a non-shifting gear arrangement could be used with a reversible motor, with stops such as the stops 72 and 74 controlling the reversing of the motor.

The carriage 48 is provided with a pair of longitudinal rods or supports 76 which in the main are horizontal and parallel to the supports 40, though spaced below these supports. At an intermediate position, the supports 76 are provided with a cam or wedge shape 78. This cam or wedge portion 78 is provided with a ramp 80 (see FIG. 5) on one side, and a similar ramp of equal slope 82 on the other side. The plates 38 are provided with slots 86 extending up from the bottom edge thereof to provide clearance for the cams 78.

Thus, as the carriage traverses from one end to the other of the track 32, the cards are successively raised up by the cam 78. Stated alternatively, the cards march up one of the ramps 80, 82, and down the other, as may be seen in FIGS. 3 and 5, the uppermost card being designated 42*a*.

Figures 5, 6:
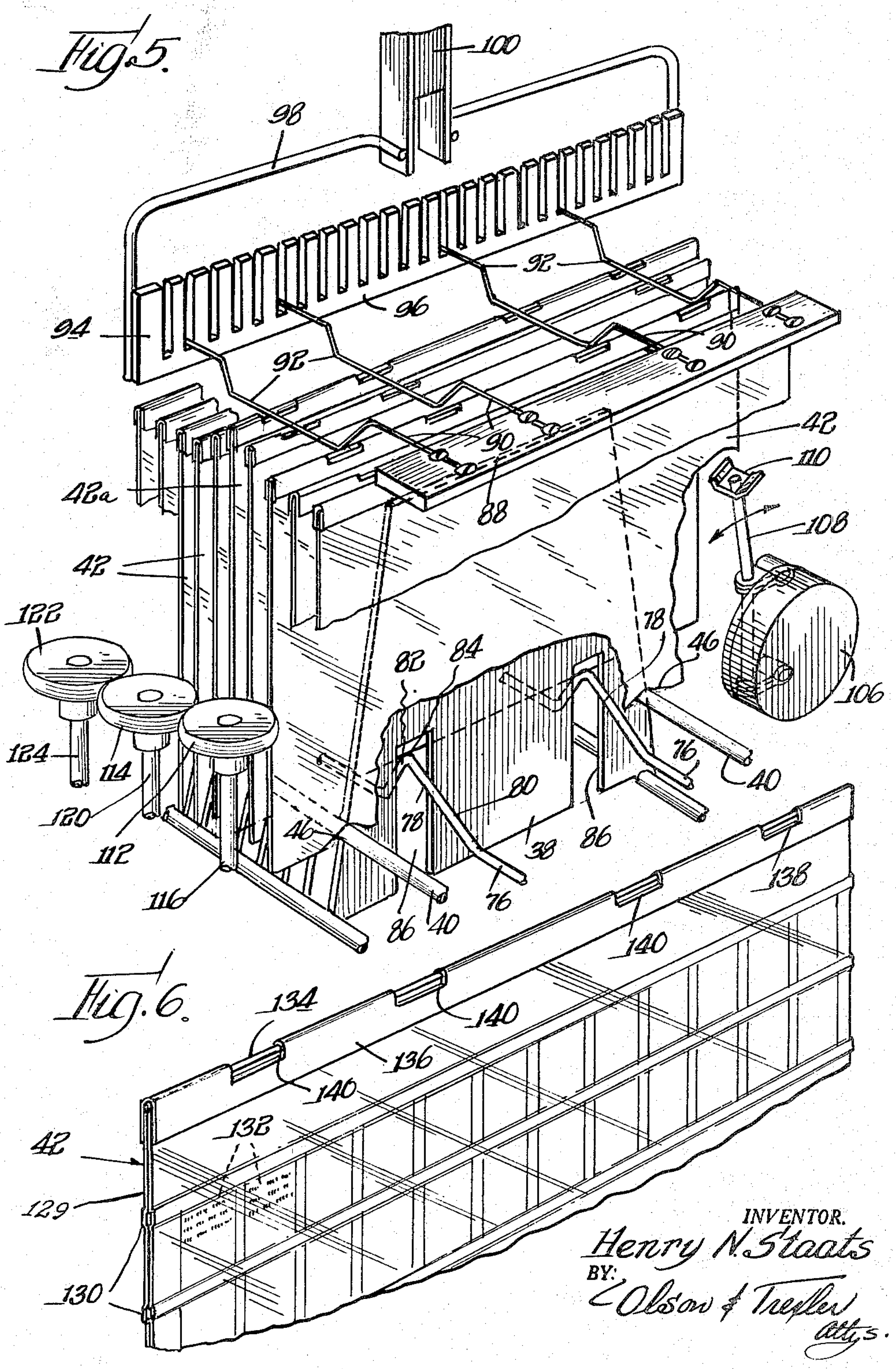
FIG. 5 is a perspective showing certain details of the system substantially at the moment of card selection.
FIG. 6 is a perspective view of a portion of a card used for documentary information storage.

Insulating support member 88 extends transversely across the carriage. This support member supports a plurality of longitudinally extending search fingers 90. Four such fingers are shown in FIG. 5, but it will be understood that this number is illustrative only. As set forth earlier in the specification, there could be as many as 128 such fingers. The fingers are provided with intermediate depressed portions 92. The opposite ends of the fingers are supported in a comb-like structure 94 having a plurality of slots therein in which the fingers 92 are individually received. A transverse underlying portion 96 of the comb-like structure 94 provides vertical support for the extending ends of the fingers 90. The comb-like support structure 94 is carried by a depending frame 98 from a solenoid plunger 100. The solenoid 102 is carried by a suitable support 104 (FIG. 3) on the top of the carriage 48.

Figure 3:
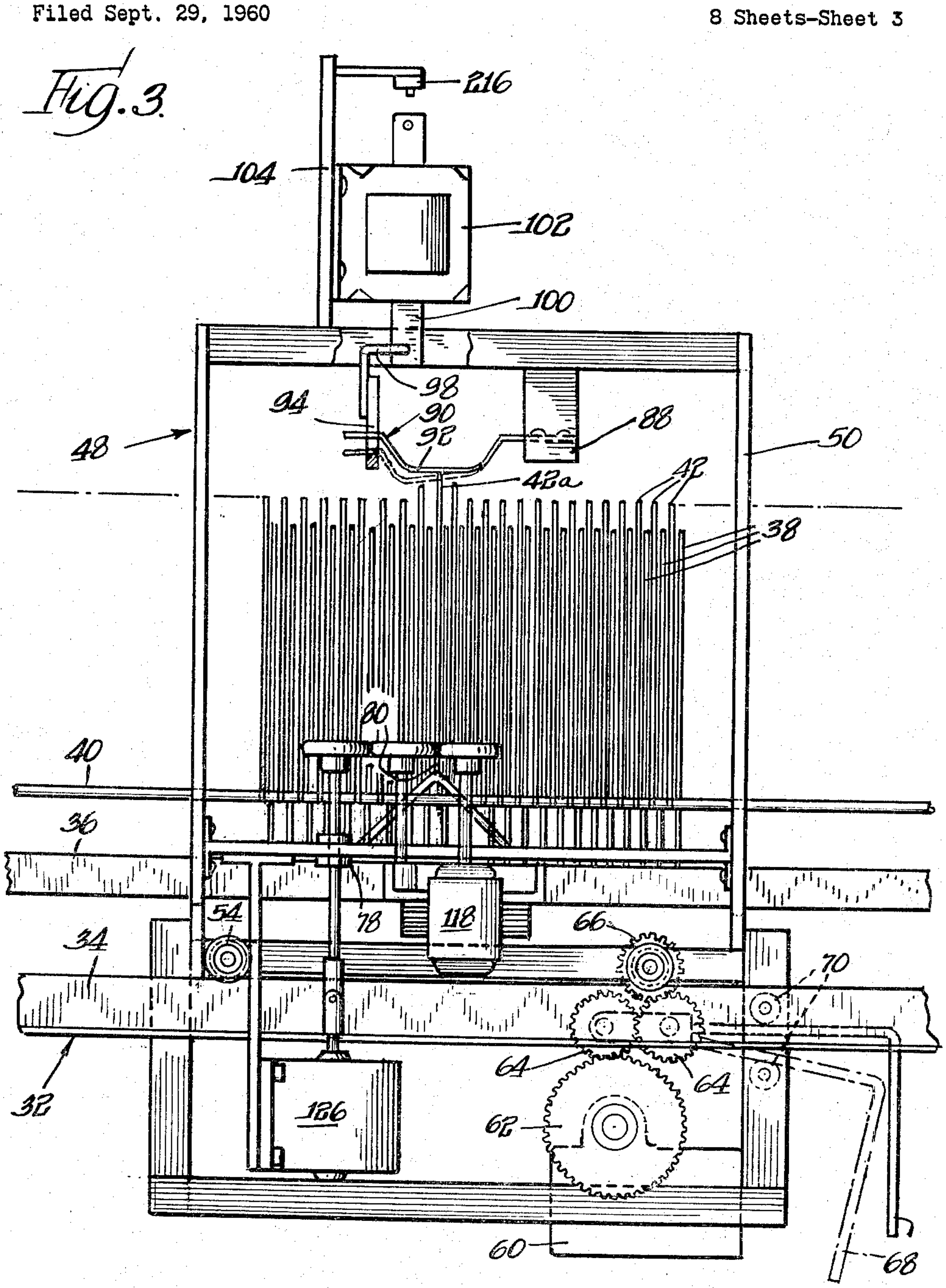
FIG. 3 is a detail side view on an enlarged scale as taken along the line 3—3 in FIG. 2.

The depressed portions 92 of the fingers 90 are positioned for engagement by the coded areas of the cards 42, as will be set forth hereinafter in greater detail. The fingers are inclined downwardly slightly as shown in FIG. 3. When a card which is coded for selection is detected by the fingers 90, the card will be ejected laterally of the carriage, as will be set forth hereinafter. In order that the cards may clear the fingers 90, the solenoid 102 is actuated to lift the structure 94 and the fingers 92 from the solid line position of FIG. 3 to which the fingers are deflected by engagement with the cards. When the fingers are lifted from card engaging position, the cards are free to be shifted laterally from the carriage.

Figure 4:
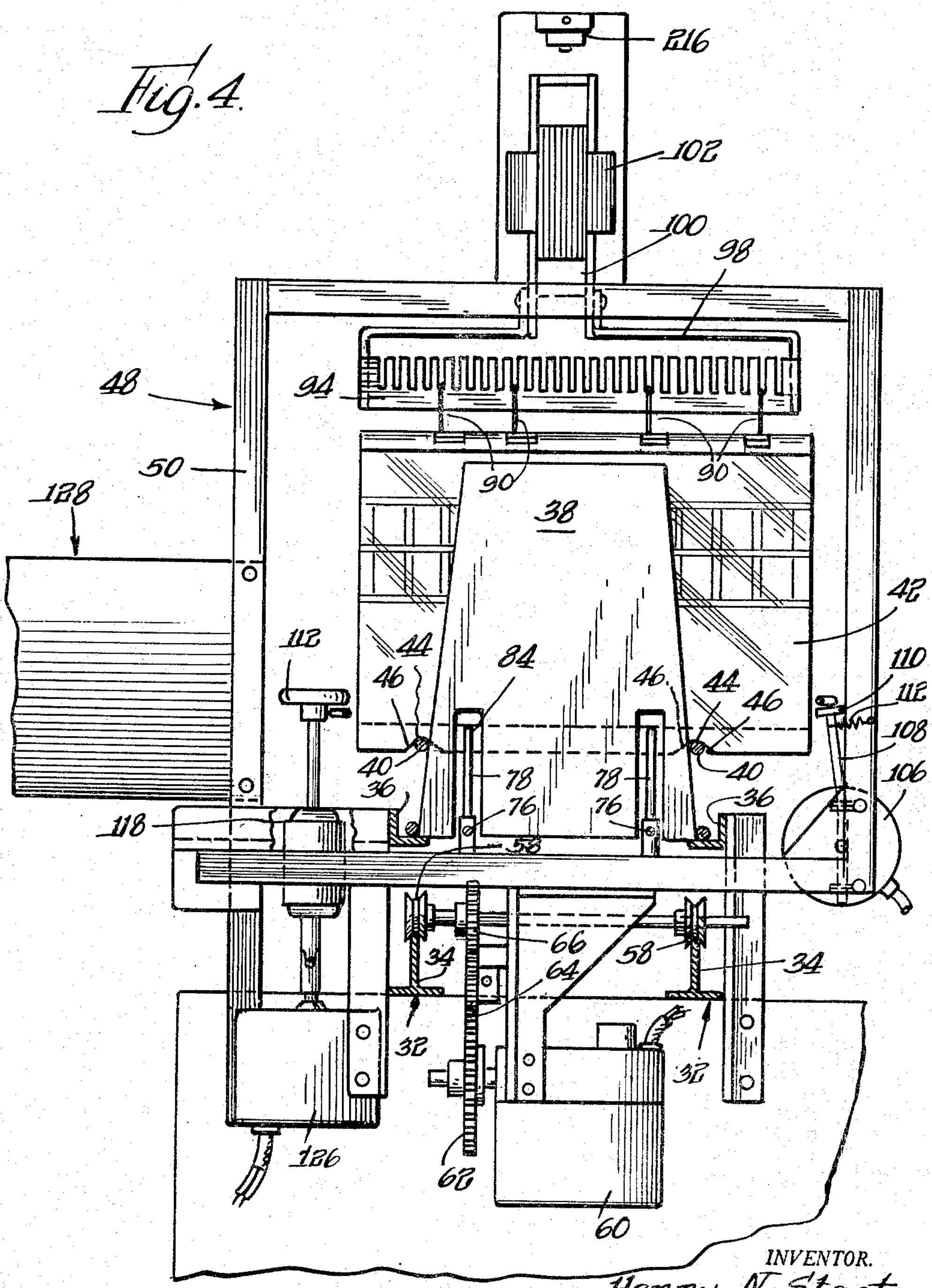
FIG. 4 is a vertical sectional view taken along the line 4—4 in FIG. 1 and on a somewhat enlarged scale.

On one side of the carriage an electro-magnetic operator 106 is supported on the carriage frame. The electromagnetic operator 106 may be of a known device type, such as a rotary solenoid, or a continuously running motor with a one-revolution clutch which is tripped electro-magnetically. The operator 106 is designed to provide a sudden oscillating movement to an arm 108 having a tapper head 110 thereon. The tapper arm 106 may be provided with a retracting spring 112 as indicated in FIG. 4. The head 110 engages the edge of a selected card and starts to eject it, to the left as viewed in FIG. 5.

Opposite to the ejector or knocker arm 108 there is provided a pair of counter-rotating, rubber tired wheels 112 and 114. The wheels are substantially in contact with one another, and preferably engage one another lightly. However, they preferably are independenly driven, since a card which is partially ejected by the ejector head 110 is to be gripped between the wheels 112 and 114 to complete the ejection. The wheel 112 is mounted on a shaft 116 which is driven by a motor 118 (FIG. 3). In the embodiment shown, the wheel 114 is rotatably mounted on an idler shaft 120, and is frictionally driven by engagement with a rubber-tired wheel 122. The wheel 122 is mounted on a shaft 124 driven by a motor 126. Obviously, the wheel 114 could be directly driven by a reversely rotating motor, where both wheels 112 and 114 could be driven from a common motor by suitable gearing. In any event, the wheels 112 and 114 are counter-rotating at a high rate of speed. Accordingly, as soon as the card enters between the wheels 112 and 114 under the influence of the ejector head 110, the card is gripped and immediately thrown to the left (in the position viewed in FIG. 5) into a triangular cross-shaped basket 128. The basket 128 has a pair of supporting walls 130 at substantially right angles, joined together at a rounded or smoothly curved bottom corner or edge 132. The trough 128 is provided with an outer wall 134 limiting outward movement of the cards. The end of the basket adjacent the cards is open for the cards to be thrown into the basket by the counter-rotating wheels 112 and 114. The wheels 112 and 122 preferably are provided with guards 136 and 138 so that should any cards be improperly centered in the storage rack, they will not engage the counter-rotating wheels, but will engage the guards and be cammed properly into place.

One form of card 42 is shown in FIG. 6. Most of the card is known per se. This card comprises two substantially contacting transparent plastic sheets 129 joined at discrete vertical horizontal spacer connections 130 between which microfilm images 132 may be inserted. Such cards and images are known. The novel feature in this card consists in the provision of the conductive wire 134 extending entirely across the top edge of the card and secured thereto. In addition, there is a plastic overlay or other insulating material 136. Every such card has one area of plastic removed near one edge as at 138 for engagement with the right hand wire or switch contact 90 of FIG. 5 to form a common connection. In addition, there are other selectively positioned openings 140 in the plastic. In the illustration of FIG. 6, there are three such areas which are positioned in accordance with a code to indicate what material may be found on the micro-images 132 of the card 42. The areas 140 may be much smaller than indicated, and as previously indicated, there may be as many as one-hundred twenty-eight such areas, with corresponding switch contacts.

A plurality of electrical circuits, including relays and manual switches are mounted in a box 142 indicated in FIG. 1. These electrical circuits are connected with the appropriate electromagnetic devices on the carriage, as by well known flexible cables. The electrical circuits, including the various switches are shown schematically in FIG. 7.

The electric circuits as housed within the box 142, and also the electrically operated devices for ejecting cards from the storage rack are shown schematically in FIG. 7.

At the left side of FIG. 7 there will be seen two manual switches 144 and 146. The switch 144 has a movable arm 148, and the switch 146 has a movable arm 150. The two switch arms are ganged as indicated at 152, and both are grounded.

Next to these switches will be seen two commutator switches 154 and 156. The commutator switch 154 has a movable arm 158, while the commutator switch 156 has a movable arm 160. These two switch arms are ganged and driven in common and indicated at 162 by a motor 164, one side of which is connected through a battery or other suitable potential source 166 to ground.

Each of the commutator switches 154 and 156 has ten movable contacts engaged in sequence by the arms 158 and 160 respectively. It will be understood that the ten contacts are illustrative, and that more or less could be used, as desired. Each of the switches 144 and 146 has eleven contacts, numbered 1–11 on the drawing. Each of the first ten contacts of switch 144 is respectively connected to the same number of contacts of switch 154. Contact 11 of switch 144 is connected by means of a wire 168 to a junction 170, which leads through a wire 172 to the switch arm 158. Similarly, contacts 1–10 of switch 146 are connected to the similarly numbered contacts of switch 156. Contact 11 of switch 146 is connected by a wire 174 to the switch arm 160.

Thus, whenever the switches 144 and 146 are on any of their respective contacts 1–10, connection will be made to the same numbered contacts of the switches 154 and 156, respectively. On the other hand, when the switches 144 and 146 are on contacts 11, connection will be made respectively to the switch arms 158 and 160, and the motor will be started, whereby the arms 158 and 160 are rapidly swept past all of the ten fixed contacts of the respective switches.

To the right of the switch 154 are ten relay chains 176. Each chain is shown in the wiring diagram of FIG. 7 as being horizontally disposed, and each of the ten chains is shown as being vertically spaced from the next adjacent chain or chains. Some of the chains are omitted for simplicity of illustration, since they are connected in parallel, and this will be understood to those skilled in the art. Each chain is respectively connected to one of the numbered contacts 1–10 of the switch 154. Each chain comprises six identical manual switch and relay switch combinations.

For example, referring to the uppermost chain, contact 1 of switch 154 is connected through a wire 178 to a single-pole, double-throw switch having a movable switch arm 180. The switch arm 180 is manually set to either upper or lower position, and in the lower position shown is "off." In this position the switch arm engages a contact 182 connected through a wire 184 to a junction 186.

The upper contact 188 engageable by the switch arm 180 is connected through a wire 190 to a relay contact 192 which is normally spaced from, but engageable with a fixed contact 194. The fixed contact is connected to the junction 186. The junction 186 is connected to a movable switch arm similar to the switch arm 180 in link 176–2 of the chain 176, this link being identical with the link 176–1 just described, as are all of the remaining links 176-3-176-6. The output connection of the chain at 196, corresponding to the junction 186, is connected to a common collector line 198. As will be seen, with all of the switch arms 180 in the "off" position as shown, there is a straight through connection from the appropriate fixed contact of the switch 154 to the collector 198. In order that any one chain may be rendered, there is provided a manual break or "off" switch as indicated at 200 in the wires 178 leading from the fixed contact of the switch 154. If any of the manually operable switch arms 180 is in its raised position, the chain circuit will be broken through the corresponding relay contacts 192, 194, since these contacts are normally open.

The collector 198 is connected through a wire 202 to a slave relay 204, the other side of which is connected to a battery or other suitable potential source 206. The wire 202 is also connected to a fixed contact 208 which is engageable by movable relay contact 210 when the relay 204 is energized. The movable contact 210 is connected to a junction 212, and this junction 212 is connected to a wire 214 to a normally closed switch 216, grounded through a wire 218. The junction 212 further is connected through a wire 220 to a relay contact 222 which is engageable upon energization of the relay 204 by a movable relay contact 224. The relay contact 224 is connected to the lifter 102 and to the ejector 106 in parallel, and thence to a suitable current source such as a battery 226.

Each of the ten contacts of the switch 156 is connected to a wire 228, there being ten such wires, 228-1-228-10. The wire 228-1 is connected through a normally open switch 230-1 to a relay 232-1. There are six relays 232, and six identical normally open switches 230-1-230-6 for connecting these relays to the wire 228-1. There are similar switches connected to the relays 232 and to the subsequent wires 228-2 et seq.

Each of the relays 232 is connected through a wire 234 to one of the switch fingers 90. Thus, there are six such wires and switch fingers, the switch fingers being identified as 90-1-90-6. A fourth search finger or contact 90-7 is connected to a battery or other suitable electric source 236. Each of the contacts 90 is engageable with the inserted wire 134 of a card, when the appropriate portions of insulation are removed from over the wire.

Supposing that it is desired to search for a card having information thereon which is coded according to positions 1 and 6 on the card. That is to say, insulation will be removed from the top edge of the card so that the wire 134 will be engaged by contact 90-1 and contact 90-6. Furthermore, it will be understood that all of the cards are exposed at position 7 for engagement by the energizing contact. If it is desired to search for only this one card, then the switch contacts 148 and 150 of the switches 144 and 146 may be placed on any desired one of fixed contacts 1-10, contact 1 for example. The corresponding disconnect switch 200 is left closed. Thus, there is a connection from ground through switch arm 148 and contact 1 to wire 178, and hence to switch contact 180. Switch contact 180 is manually raised to the "on" position in chain link 176-1. Similarly, the manual switch arm is raised to the "on" position in link 176-6. Thus, at the present time the circuit is broken in links 1 and 6.

The switch 230-1 leading to the first of the relays 232 is manually closed, as is the switch contact 230-6. Whenever any of the switch contacts 90-2-90-5 engages the wire 134 of a card, no result is produced, due to the open switches 230-2-230-5. Whenever the contact 90-1 engages the wire 134, a connection is completed through the relay 232-1, the manually closed switch 230-1, wire 228-1, contact 1 and switch arm 160 and wire 174 and contact 11 and switch arm 150 to ground (if the commutator is used), or from wire 228-1 to contact 1 of switch 146 and switch arm 150 to ground if the commutator is not used, to close the relay contacts in the first link of all ten of the chains 176. The links are similarly closed when the contact 90-6 engages a card wire 134. Thus, if both switch fingers 90-1 and 90-6 engage a wire 134 at the same time, the circuit is completed through chain links 176-1 and 176-6. Of course, the circuit is completed through links 176-2-176-5 through the normally down position of the switch arms 180, as previously explained. Thus, ground potential is supplied to the collector 198.

The battery 206 thus causes the relay 204 to close. The contacts 208, 210 close quickly, and contacts 222, 224 close substantially immediately thereafter. Ground is supplied to the relay through the switch 216 and the contacts 208, 210, to hold the relay in, even when the search fingers 90-1 and 90-6 leave the card. The battery 226 supplies power through the lifter 102 and ejector 106 and through the contacts 222, 224 to ground through the wire 214 and switch 216. The lifter operates immediately to lift the search fingers 90 out of contact with the top edge of the card, and the ejector 106 throws the card off to one side where it is caught by the rapidly rotating wheels 112 and 114 to complete the ejection into the collector basket 128. As the lifter completes its upward travel it engages the switch 216 to open this switch. The holding circuit for the relay 204 is thus broken, and the relay drops out. The carriage will continue its traverse from end to end of the search rack, which may be anywhere from a few feet to a hundred feet or more in length, and eventually all of the cards coded at 1 and 6 are removed into the basket.

Up to ten coded combinations can be selected at the same time, by appropriately manipulating the manual switches 180, and the manual switches 230, and by turning the switches 144 and 146 so that the switch arms engage contact 11. This causes the motor 164 to run, to cause the contact arms 158 and 160 to sweep the corresponding fixed contacts at a relatively high rate. The sweep rate is sufficient that all ten of the contacts are engaged each time a card is raised into contact with the search fingers 90. Thus, the relays 232 are conditioned for operation ten times during each card engagement. Whether or not the relays will close depends, or course, on the conditions of the manually operable switches 230 and on the exposed code areas of a card. Whether closure of the relay contacts 192, 194 in any chain completes a circuit depends on the combinations in which they are closed. However, each card is searched for ten possible combinations while it is in raised position. Accordingly, ten different card codings can be selected as the carriage traverses the storage rack. If it is desired to search any number between one and ten, only certain of the chains 176 are used, the appropriate disconnect switches 200 being operated. Obviously, the switches 230 will be closed in only the positions correspondingly to the chains used.

The provision of the holding contacts 208, 210 on the relay 204 is quite important in connection with searching when the commutator switches 154 and 156 are in operation, since the circuit through any chain will be completed only instantaneously, and immediately broken.

A modification of the invention is shown in FIGS. 8-10 which provides for greater preciseness in selection of cards, and in operation of certain of the switches. In the embodiment of FIGS. 5-10, similar structural parts are identified with numerals similar to those heretofore used, with the addition of the suffix *b*. The cards 42 remain absolutely identical with those shown, and remain identified by the numeral 42.

In the embodiment of FIGS. 8-10, the two ramps 78*b* are provided with inclined rising surfaces 80*b*. However, on the back side, the ramps 78*b* drop off quite sharply at 238, substantially vertically. A flat 240 is provided at the top. A platform 242 is provided on the vertical side to catch a dropping card above the level of the supports 40*b* on each ramp 78*b*. A switch 244 is provided on the platform 242, and the electrical nature of this will be explained shortly hereinafter in accordance with FIG. 7*a*. The ramps or wedges 78*b* are mounted on shafts 246 geared at 248 to shafts 250 projecting from a motor 252. The motor is controlled by suitable switch means 253 operated by the lever 68 so as to reverse the ramps or wedges 78*b* when the direction of traverse of the carriage reverses.

The flat spot 240 at the top of the ramps or wedges holds the card momentarily in elevated position as indicated at 42*a* to insure proper engagement thereof by the switch contacts 90*b*. In the present instance, the switch contacts are not lifted out of contact with the card, and literally throw the card down onto the switch 244 and platforms 242. The switch 244 then operates to cause ejectment of predetermined ones of the cards.

Reversal by rotation of the wedges or ramps 78*b* will readily be seen by considering FIGS. 9 and 10 together, wherein the ramps or wedges have been reversed.

FIG. 7*a* corresponds to FIGS. 8–10, and hence parts similar to those previously described are identified by like numerals with the addition of the suffix *b*. The wire 202*b* connects the same as the wire 202 previously described, all of the circuits to the left of the wire 202 in FIG. 7 being carried over into FIG. 7*a*. Thus, whenever ground is applied to the wire 202*b* by the search fingers encountering a desired card, the battery or the like 206*b* applies power to the relay 204*b* to energize it, thereby closing contacts 208*b* and 210*b*, and contacts 222*b* and 224*b*. The contacts 208*b* and 210*b* lock in the relay as previously described, while the contacts 222*b*, 224*b*, condition the circuit to the ejector. The switch 244 includes the normally closed contacts 216*b* in a holding circuit, and also includes normally open contacts 254 in series with the ejector 106*b*. Hence when the card 42 drops off the flat 240 at the top of the ramp or wedge onto the switch 244, the contacts 254 are closed to operate the ejector 106*b* to throw a card out into position where it is caught by the rapidly spinning wheels 112 and 114 for final ejectment into the gasket 128. Substantially simultaneously, or a very slight increment of time thereafter the contacts 216*b* open, whereby the relay drops out before the next card drops onto the platforms 242, unless of course, the next card also triggers the circuit.

The showing in FIG. 12 is in the nature of a recapitulation of what has gone heretofore, although only four relays 232 are shown. The circuit is provided with two grounding contacts 90 received adjacent the upper corners of the card, and the parts of the card are provided with V-shaped notches 256 at these locations so that the outside wires 90 will centralize the card relative to the search fingers or pick-up wires. The circuit summarized in FIG. 12 is a parallel circuit allowing large numbers of combinations to be established as previously set forth.

FIG. 11 is a representation of a series circuit. The card 42*c* is similar to that heretofore shown and described, except that the wire sections 134*c* exposed at the installation cutouts 140*c* are discrete and insulated from one another. Instead of a single search finger 90 engaging each exposed area of wire, there are two closely adjacent parallel search fingers 90*c*. Hence, a circuit is connected between adjacent fingers 90*c* whenever a bare area of wire is engaged by the fingers. Adjacent pairs of fingers are interconnected at 258 by wires, whereby when every one of the pairs of fingers engages a metal segment, a complete circuit will be made from a battery 236*c* off to a utilization circuit, such as the ejector and lifter, as indicated by the arrowhead 260.

Various modifications of the card are shown in FIGS. 13–17. In FIG. 13, the card 42*d* is made of metal, and preferably is coated with zinc oxide so that micro-images can be reproduced directly thereon by the electrostatic process known commercially as "Electrofax." The top edge of the metal card is covered by a plastic overlay at 136*d*, and the plastic is notched at appropriate locations 140*d* in accordance with the code relative to the information on the card.

The embodiment of FIGS. 14 and 14*a* is quite similar to the original disclosed embodiments of the card. Similar numerals are used with the addition of the suffix *e*, and the card 42*e* is illustrated as being made of plastic, although it may be made of pasteboard or some other non-conductive sheet material. The plastic covering 36*e* in this instance receives a thin rectangular metal strip or rod 134*e*, rather than a round wire, and is provided with a pair of depending flanges or skirts 262 joined together at 264 immediately below the strip 134*e*. The flanges or skirts 262 are provided on their inner surfaces with adhesive material 266 so that the properly coated plastic material 136*e* and conductive insert 134*e* combination can simply be attached to pre-existing documentary record cards.

The card shown somewhat schematically in FIG. 15 is of a sandwich construction, having an inner ply or layer 268, with outer plies or layers 270 secured to the opposite faces thereof. As shown in FIG. 16, the two outer plies or faces 270*f* are of metal, again preferably coated with zinc oxide, and the inner ply or layer 268*f* is of insulating material, such as plastic. Thus, information can be directly reproduced on both faces of a card by an electrostatic process. Of course, on any card information can be placed on both faces by suitable processes. A plastic overlay suitably coated will go over the top edge of a card in FIG. 16, but this is not shown. The two metal plies 270*f* can be coded differently, if so desired, and different information can be put on the two surface plies. This requires proper shaping of the coding notches in the plastic overlay, and requires some sophistication in the search fingers.

In the sandwich embodiment of FIG. 17, the outer plies 270*g* are of plastic or other insulating material, while the inner plate or ply 268*g* is of metal. Thus, the inner ply of the card is used directly for the contact, no insert being required, and the information is reproduced in suitable manner such as by printing, or photographically on either or both of the outer plies 270*g*. The inner ply 268*g* may terminate slightly below the top edges of the outer plies 270*g*, in which instances no plastic overlay is needed. The outer plies then are suitably notched for coding. Alternatively, of course, a plastic overlay could be used. As will be apparent, the sandwich construction type of card presents a particularly stiff card, and this in many instances is quite desirable.

The cards can be re-inserted in the storage magazine between the plates 38 by hand when they have been used for their intended purpose. Alternatively, as shown in FIGS. 18–20, they can be re-inserted automatically. In these figures, which are somewhat schematic in nature, parts similar to those previously described are identified by like numerals with the addition of the suffix *h*. In addition to the receiving basket 128*h*, the carriage 48*h* carries a loading basket 262, the carriage being elongated somewhat for this purpose. The loading basket 262 is box-like or rectangular in nature, and has a back-up plate 264 urged by a spring 266 against a stack of cards 42. A ram 268 operated by a solenoid 270 is provided which is operable upon closing of the proper circuit to thrust the card opposite the spring 266 into place between two rapidly rotating rubber-tired wheels 272 which very quickly thrust the card into a vacant space between the plates 38*h*. A back-up member 274 is provided to prevent the cards from being thrown completely through the magazine. The back-up member conveniently is carried by the carriage, and preferably is of a viscous material to minimize rebound. Shield plates 276 are provided adjacent the wheels 272 and between the wheels and the storage rack so that the cards which tend to rebound from the stop 274 simply engage the trailing plate 276 and do not come into contact with either of the wheels 272.

As is shown in FIG. 19, a switch 278 is provided in the carriage and has an operating arm 280 with a horizontal card engaging portion 282 thereon. The card engaging portion 282 is of sufficient length to span two cards in the storage rack, and hence rides simply on top of the cards. However, when an empty space between plates 38*h* is encountered, as in shown in FIG. 19, the operating arm 280 drops into the space to close the switch 278, thereby to operate the solenoid 270. Devices such as the ram 268 for peeling a card or sheet of paper off a stack are well known in the art, and need not be described in detail.

In accordance with the present invention as heretofore described, up to a certain number of parameters is used for coding. There could be as many as six parameters in accordance with the electrical diagram shown, although it is apparent that this is capable of considerable expansion, to well over one hundred. If it should be desired to pick out a card having only one code parameter thereon, the system will operate as heretofore described, and all cards with this one coded area will be selected, regardless of whatever areas may be exposed for engagement by the search fingers. If it is desired to select cards having only the one given area exposed, then additional switch contacts are provided in each search finger operator relay to open the circuit to the slave relay. Hence, the card will be selected when only the pre-selected is exposed, and no other.

Reference has been made to setting up the switch combinations manually, and it is apparent that this can be done electrically, as from the punched tape or the like. In fact, it is within contemplation of this invention that automatic mechanism could be provided whereby when a desired search has been completed, the next desired search on a punched tape would automatically be set up in the electrical circuits.

In accordance with the present invention, as will now be clear, the storage rack and accompanying track on which the carriage moves can be of substantially any length. In fact, they can originally be made of rather limited length, and can readily be extended if the documentary information to be stored should later grow. The scanning is extremely rapid, being only across the thickness of the card, something on the order of one-sixty-fourth inch being typical. The card itself becomes a part of the electrical circuit for a moment, and the ram ejector coupled with the rapidly rotating ejector wheels ejects the cards so rapidly that it is ejected substantially at the same instant that it is detected, thereby obviating any need for the carriage to stop and back up to an ejecting position, with the usual attendant hunting of such devices.

The spring contacts for searching the card may be used for centralizing the card, and also serves to provide a spring return into seated position as the cards pass over the wedge or card rippler. The spring contacts are lifted away from the card for ejection of the card, in accordance with one form of the invention, but are not so listed when there is a rapid drop-off to the wedge with a switch at the bottom thereof for triggering ejection.

Power is supplied to the carriage by means of long flexible cables and take up devices, both of which are known per se, and which therefore are not shown in print. A basket has been shown for catching the cards as they are ejected from the storage rack, but it will be apparent that a conveyor belt could be provided instead of the basket to allow cards to be delivered continuously to a master station.

In accordance with one form of the invention, automatic means is provided for refiling cards. Vacant spaces are detected, for example by the switch illustrated, but alternatively by a photoelectric or any other suitable type of detector. A ram is provided to start the cards to reinserted position, and rollers or wheels are provided for completing insertion.

The cards may be made completely of metal, and insulated at proper places. With metal cards, the storage rack preferably is insulated, although it can be metallic and complete the ground connection to the cards. Alternatively, the cards can be of laminated construction, comprising metal and insulation, with the insulation either on the outside or on the inside. As has been set forth, when a metal face is exposed, the metal can be properly treated, as with a zinc oxide coating, to allow electrostatic printing directly thereon. As a further embodiment of the card, the card may be of insulating material. It may be transparent for insertion of images, or may be opaque for reproduction of images by photographic or printing techniques. With a completely insulated card, a metal contact is added. Coding of the card is accomplished by exposing predetermined areas of metal along the top edge of the card. It will be apparent that the two side and bottom edges could also be used for coding, if so desired.

The circuitry is relatively simple, comprising chain relay circuits and a potential detector. The proper combinations are readily set up manually, but can also be set up by multiplexing, if so desired, such as by a commutator drum and paper tape.

It is anticipated that, in large documentation systems, more than one scanning head will be used on separate racks. All scanning heads can be, but not necessarily so, connected in parallel so that simultaneous search can be carried out.

The use of electrically active cards, in the manner described, in a large scale documentation system permits relatively low cost equipment and components to be used. However, where cost is not a major criterion, higher search speeds may be attained by use of electronic circuitry and components.

In this embodiment, actual physical contact with an appropriately coded card is discussed in great detail. However, it is obvious that the advantages of scanning only edges of cards can also be applied to systems where coding is not performed by actual contact. Examples of this may include photoelectric, metal proximity detectors and the like.

The specific embodiments of the invention as herein shown and described are for purposes of illustration, as will be understood. Various changes in structure will no doubt occur to those skilled in the art, and will be understood as forming a part of this invention insofar as they fall within the spirit and scope of the appended claims.

The invention is claimed as follows:

1. A card storage and retrieval system comprising a plurality of like file cards having information indicia thereon, electrically conductive means on an edge portion of each card exposed at predetermined card edge locations in code positions according to the information on each card; frame means, storage means on said frame means for supporting a plurality of like file cards on edge in vertical position in closely spaced face-to-face relation with the coded edges disposed in a common direction, carriage means, means movably supporting said carriage means from said frame means, means acting between said carriage means and said support means for causing said carriage means continuously to traverse said storage means perpendicular to the faces of said cards in accordance with a predetermined arrangement, means for sensing the position of said carriage and acting to reverse the direction of traverse thereof upon reaching a limit position in either direction, a plurality of electrical search means on said carriage respectively engageable with the coded locations of said cards while said carriage is moving, electric means on said carriage for engaging and ejecting cards from said storage means while said carriage is moving, and electric means including selective switch means interconnecting said search means and said ejecting means for operating said ejecting means when said search means encounter the card electrical conductive means at predetermined exposed locations.

2. A card storage and retrieval system as set forth in claim 1 wherein the electric means for ejecting cards comprises a ram and an electromagnetic operator.

3. A card storage and retrieval system comprising a plurality of like file cards having information indicia thereon, electrically conductive means on an edge portion of each card exposed at predetermined card edge locations in code positions according to the information on each card; frame means, storage means on said frame means for supporting a plurality of like file cards on edge in vertical position in closely spaced face-to-face relation with the coded edges disposed in a common direction, carriage means, means movably supporting said carriage means from said frame means, means acting between said carriage means and said support means for causing said carriage means to traverse said storage means perpendicular to the faces of said cards, a plurality of electrical switch means on said carriage respectively engageable with the coded locations of said cards, electrically operated means on said carriage for engaging and ejecting the cards from said storage means, wedge means on said carriage means for moving said cards from normal storage position into position for engagement with said search means and for thereafter returning non-ejected cards to normal storage position, and electric means including selective switch means interconnecting said search means and said ejecting means for operation thereof when said search means encounter the card electrical conductive means at predetermined exposed locations.

4. A system as set forth in claim 3 wherein the wedge means has a shallow ramp for moving the cards away from storage position, and a sharp drop-off for returning the cards to storage position, the electric means for operating the ejecting means including a switch adjacent the sharp drop-off and closed by a card dropping off the wedge.

5. A system as set forth in claim 4 and including means for reversing the wedge in accordance with the direction of traverse of the carriage.

6. A card storage and retrieval system comprising a plurality of like file cards having information indicia thereon, electrically conductive means on an edge portion of each card exposed at predetermined card edge locations in code positions according to the information on each card; frame means, storage means on said frame means for supporting a plurality of said file cards on edge in vertical position in closely spaced face-to-face relation with the coded edges disposed in a common direction, carriage means, means movably supporting said carriage means from said frame means, means acting between said carriage means and said support means for causing said carriage means continuously to traverse said storage means perpendicular to the faces of said cards in accordance with a predetermined arrangement, a plurality of electrical search means on said carriage respectively engageable with the coded locations of said cards while said carriage is moving, electrically operated means on said carriage for engaging and ejecting cards from said storage means while said carriage is moving, means for retracting said search means from said cards during ejection of a card, and electrical means including selective switch means interconnecting said search means and said ejecting means for operating said ejecting means when said search means encounter the card electrically conductive means at predetermined exposed locations.

7. A card storage and retrieval system comprising a plurality of like file cards having information indicia thereon, electrically conductive means on an edge portion of each card exposed at predetermined card edge locations in code positions according to the information on each card; frame means, storage means on said frame means for supporting a plurality of said file cards on edge in vertical position in closely spaced face-to-face relation with the coded edges disposed in a common direction, carriage means, means movably supporting said carriage means from said frame means, means acting between said carriage means and said support means for causing said carriage means to traverse said storage means perpendicular to the faces of said cards, a plurality of electrical search means on said carriage respectively engageable with the coded locations of said cards, electrically operated means on said carriage for engaging and ejecting cards from said storage means, a basket on said carriage and movable therewith relative to said storage means for receiving cards ejected from storage position, and electrical means including selective switch means interconnecting said search means and said ejecting means for operating thereof when said search means encounter the card electrically conductive means at predetermined exposed locations.

8. A card storage and retrieval system comprising a plurality of like file cards having information indicia thereon, electrically conductive means on an edge portion of each card exposed at predetermined card edge locations in code positions according to the information on each card; frame means, storage means on said frame means for supporting a plurality of said file cards on edge in vertical position in closely spaced face-to-face relation with the coded edges disposed in a common direction, carriage means, means movably supporting said carriage means from said frame means, means acting between said carriage means and said support means for causing said carriage means continuously to traverse said storage means perpendicular to the faces of said cards according to a predetermined arrangement, a plurality of electrical search means on said carriage respectively engageable with the coded locations of said cards while said carriage is moving, electrically operated means on said carriage for engaging and ejecting cards from said storage means while said carriage is moving, means coacting between said carriage and movable therewith relative to said storage means and said frame means for reversing the direction of traverse of said carriage at predetermined locations, and electrical means including selective switch means interconnecting said search means and said ejecting means for operating said ejecting means when said search means encounter the card electrically conductive means at predetermined exposed locations.

9. A card storage and retrieval system comprising a plurality of like file cards having information indicia thereon, electrically conductive means on an edge portion of each card exposed at predetermined card edge locations in code positions according to the information on each card; frame means, storage means on said frame means for supporting a plurality of like file cards on edge in vertical position in closely spaced face-to-face random relation with the coded edges disposed in a common direction, carriage means, means movably supporting said carriage means from said frame means, means acting between said carriage means and said support means for causing said carriage means to traverse said storage means perpendicular to the faces of said cards, a plurality of electrical search means on said carriage respectively engageable with the coded locations of said cards, electrically operated means on said carriage for engaging and ejecting cards from said storage means while said carriage is moving, electric means including selective switch means interconnecting said search means and said ejecting means for operating thereof when said search means encounter the card electrical conductive means at predetermined exposed locations, and means on said carriage for automatically returning cards at random to vacant spaces in said storage means while said carriage is moving.

10. A card storage and retrieval system comprising frame means, storage means on said frame means for supporting a plurality of like file cards on edge with a coded edge of each card disposed in a common direction, carriage means, means movably supporting said carriage means from said frame means, means acting between said carriage means and said support means for causing said carriage means continuously to traverse said storage means perpendicular to the faces of said cards, a plurality of electrical search means on said carriage engageable with said coded locations on cards in said storage means while said carriage is moving, electrically operated means on said carriage for engaging and ejecting selected cards from said storage means while said carriage is moving, and electrical means including selective switch means interconnecting said search means and said ejecting means for operating said ejecting means when said search means encounter predetermined coded locations on cards in said storage means.

11. A card storage and retrieval system comprising a plurality of like file cards having information indicia thereon, each card having a coded exposed edge portion according to the information on each card; frame means, storage means on said frame means for supporting a plurality of like file cards on edge in vertical position in closely spaced face-to-face relation with the coded edges disposed in a common direction, carriage means, means movably supporting said carriage means from said frame means, means acting between said carriage means and said support means for causing said carriage means continuously to traverse said storage means perpendicular to the faces of said cards according to a predetermined arrangement in either direction, electrical search means on said carriage, said electrical search means including switch means cooperable with the coded edges of said cards while said carriage is moving, means on said carriage for engaging and ejecting cards from said storage means while said carriage is moving, and electric means interconnecting said electrical search means and said ejecting means for operating said ejecting means when said search means encounter the proper coded card edges.

12. A card storage and retrieval system comprising a plurality of like file cards having information indicia thereon, electrical conductive means on an edge portion of each card exposed at predetermined card edge locations in code positions according to the information on each card; frame means, storage means on said frame means for supporting a plurality of like file cards on edge in vertical position in closely spaced face-to-face relation with the coded edges disposed in a common upward direction, a plurality of electric contacts elongated substantially perpendicular to the faces of said cards and disposed adjacent to the coded edges of the cards above said cards in spaced relation thereto and each positioned for engagement by a respective coded card edge location, movable card displacement means disposed beneath said cards and movably supported from said frame means, means acting between said frame means and said displacement means for continuously moving said displacement means perpendicular to said cards, said displacement means acting successively to displace all of said cards edgewise upwards toward and then reversely away from said elongated electric contact means while said displacement means is moving perpendicular to said cards, electrically operated means for engaging and ejecting selected cards from said storage means, and electric means interconnecting said elongated electric contact means and said ejecting means for selective operation of said ejecting means selectively to eject a card when the elongated electric contact means engage the card electrically conductive means at predetermined exposed locations.

13. A card storage and retrieval system comprising a plurality of like file cards having information indicia thereon, electrically conductive means on an edge portion of each card exposed at predetermined card edge locations in code positions according to the information on each card; frame means, storage means on said frame means for supporting a plurality of like file cards on edge in vertical position in closely spaced face-to-face relation with the coded edges disposed in a common direction, carriage means, means movably supporting said carriage means from said frame means, means acting between said carriage means and said support means for causing said carriage means to traverse said storage means perpendicular to the faces of said cards, a plurality of electrical switch means on said carriage respectively engageable with the coded locations of said cards, electric means on said carriage for engaging and ejecting cards from said storage means, electric means including selective switch means interconnecting said search means and said ejecting means for operating thereof when said search means encounter the card electrical conductive means at predetermined exposed locations, said electric means for ejecting cards comprising a ram and an electromagnetic operator, and rapidly rotating roller means into engagement with which the ram moves a card for final ejectment of the card.

14. A card storage and retrieval system comprising a plurality of like file cards having information indicia thereon, each card having a coded exposed edge portion according to the information on each card; frame means, storage means on said frame means for supporting a plurality of like file cards on edge in vertical position in closely spaced face-to-face relation with the coded edges disposed in a common upward direction, carriage means, means movably supporting said carriage means from said frame means, means acting between said carriage means and said support means for causing said carriage means continuously to traverse said storage means perpendicular to the faces of said cards; electrical search means on said carriage disposed above said cards, said electrical search means including switch means cooperable with the coded edges of said cards, electrically operated means on said carriage for selectively engaging and ejecting cards from said storage means, means on said carriage means for moving all of said cards successively edgewise upwards from normal storage position into position for engagement with said search means and for thereafter reversely returning non-ejected cards to normal storage position while said carriage is continuously moving perpendicular to said cards, and electric means interconnecting said search means and said ejecting means when said search means encounter the proper coded card edges.

15. A card storage and retrieval system comprising a plurality of like file cards having information indicia thereon, electrical conductive means on an edge portion of each card exposed at predetermined card edge locations in code positions according to the information on each card; frame means, storage means on said frame means for supporting a plurality of like file cards on edge in vertical position in closely spaced face-to-face relation with the coded edges disposed in a common upward direction, a plurality of electric contacts elongated substantially perpendicular to the faces of said cards and disposed above and adjacent to the coded edges of the cards in spaced relation thereto and each positioned for engagement by a respective coded card edge location, movable card displacement means disposed beneath said cards and movably supported from said frame means, means acting between said frame means and said displacement means for continuously moving said displacement means perpendicular to said cards, said displacement means acting successively to displace said cards edgewise substantially vertically up toward and then reversely down away from said elongated electric contact means while moving perpendicular to said cards, and means for indicating the identity of a card when the elongated electric contact means engage the card electrically conductive means at predetermined exposed locations.

16. A card storage and retrieval system comprising a plurality of like file cards having information indicia thereon, electrically conductive means on an edge portion of each card exposed at predetermined card edge locations in code positions according to the information on each card; frame means, storage means on said frame means for supporting a plurality of like file cards on edge in vertical position in closely spaced face-to-face relation with the coded edges disposed in a common upward direction, carriage means, means movably supporting said carriage means from said frame means, means acting between said carriage means and said support means for causing said carriage means continuously to traverse said storage means perpendicular to the faces of said cards, a plurality of electrical search means on said carriage disposed above said cards and respectively engageable with the coded locations of said cards, wedge-type cam means on said carriage means and beneath said cards for moving said cards edgewise up from normal storage position into position for engagement with said search means and for thereafter returning non-ejected cards to normal storage position while said carriage is moving perpendicular to said cards.

References Cited by the Examiner

UNITED STATES PATENTS

| | | | |
|---|---|---|---|
| 698,597 | 4/02 | Votaw | 209—81 |
| 2,448,759 | 9/48 | Armbruster | 235—61.111 |
| 2,502,785 | 4/50 | Gottschalk. | |
| 2,620,389 | 12/52 | Potter | 340—74.1 |
| 2,640,647 | 6/53 | Rand | 235—61.12 |
| 2,690,301 | 9/54 | Wilson | 235—61.12 |
| 2,697,514 | 12/54 | Stahl | 209—72 |
| 2,709,001 | 5/55 | Stahl. | |
| 2,719,629 | 10/55 | Robinson | 209—72 |
| 2,918,656 | 12/59 | Nolde | 340—173 |
| 3,034,512 | 5/62 | Hunter. | |

SAMUEL F. COLEMAN, *Primary Examiner.*

ROBERT C. RIORDON, ROBERT B. REEVES, E. A. FALLER, Jr., *Examiners.*